(12) United States Patent
Sah et al.

(10) Patent No.: US 7,130,734 B2
(45) Date of Patent: Oct. 31, 2006

(54) TWO CLUTCH FIXED-RATIO EXIT CONTROL FOR MULTI-MODE HYBRID DRIVE

(75) Inventors: Jy-Jen F. Sah, West Bloomfield, MI (US); Todd M Steinmetz, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 248 days.

(21) Appl. No.: 10/686,176

(22) Filed: Oct. 14, 2003

(65) Prior Publication Data

US 2005/0080541 A1    Apr. 14, 2005

(51) Int. Cl.
*F16H 61/04*    (2006.01)
*B60L 11/02*    (2006.01)
(52) U.S. Cl. .............................. 701/67; 74/335; 701/51
(58) Field of Classification Search ................ 701/51, 701/53, 67; 74/335, 339, 665 R; 180/65.2; 477/3, 5, 79, 80, 174; 192/3.51
See application file for complete search history.

(56) References Cited

U.S. PATENT DOCUMENTS

| | | | | |
|---|---|---|---|---|
| 5,833,570 A | * | 11/1998 | Tabata et al. .................. 477/3 |
| 5,931,757 A | | 8/1999 | Schmidt | |
| 5,979,257 A | * | 11/1999 | Lawrie ........................ 74/335 |
| 5,993,350 A | * | 11/1999 | Lawrie et al. ................. 477/5 |
| 6,006,620 A | * | 12/1999 | Lawrie et al. ................ 74/335 |
| 6,019,698 A | * | 2/2000 | Lawrie et al. ................. 477/5 |

* cited by examiner

*Primary Examiner*—Dalena Tran
(74) *Attorney, Agent, or Firm*—Christopher DeVries (57) ABSTRACT

An electrically variable transmission has a pair of clutches and a first mode when the first clutch is applied and the second clutch released, a second mode when the second clutch is applied and the first clutch released, and a fixed-ratio mode when both clutches are applied. Upshifts and downshifts out of fixed-ratio are accomplished in accordance with a control based upon shift confidence factors determined in accordance with proportional and derivative input speed error quantities. Additional authority limits are placed upon the shift confidence factors in accordance with output speed derivative quantities. Additional override downshift control is provided in accordance with additional input speed condition determinations.

8 Claims, 6 Drawing Sheets

|  |  | Ni_diff | | |
|---|---|---|---|---|
|  |  | Positive | Near Zero | Negative |
| Ni_diff_dot | Positive | ++ | + | 0 |
|  | Near Zero | + | 0 | - |
|  | Negative | 0 | - | -- |

FIG. 7A

|  |  | Ni_diff | | |
|---|---|---|---|---|
|  |  | Positive | Near Zero | Negative |
| Ni_diff_dot | Positive | -- | - | 0 |
|  | Near Zero | - | 0 | + |
|  | Negative | 0 | + | ++ |

FIG. 7B

TWO CLUTCH FIXED-RATIO EXIT CONTROL FOR MULTI-MODE HYBRID DRIVE

TECHNICAL FIELD

The present invention is related to clutch control in a multi-mode hybrid transmission. More particularly, the invention is concerned with transitioning from a two-clutch application condition into a single clutch application condition.

BACKGROUND OF THE INVENTION

Various hybrid powertrain architectures are known for managing the input and output torques of various prime-movers in hybrid vehicles, most commonly internal combustion engines and electric machines. Series hybrid architectures are generally characterized by an internal combustion engine driving an electric generator which in turn provides electrical power to an electric drivetrain and to a battery pack. The internal combustion engine in a series hybrid is not directly mechanically coupled to the drivetrain. The electric generator may also operate in a motoring mode to provide a starting function to the internal combustion engine, and the electric drivetrain may recapture vehicle braking energy by also operating in a generator mode to recharge the battery pack. Parallel hybrid architectures are generally characterized by an internal combustion engine and an electric motor which both have a direct mechanical coupling to the drivetrain. The drivetrain conventionally includes a shifting transmission to provide the necessary gear ratios for wide range operation.

Electrically variable transmissions (EVT) are known which provide for continuously variable speed ratios by combining features from both series and parallel hybrid powertrain architectures. EVTs are operable with a direct mechanical path between an internal combustion engine and a final drive unit thus enabling high transmission efficiency and application of lower cost and less massive motor hardware. EVTs are also operable with engine operation mechanically independent from the final drive or in various mechanical/electrical split contributions thereby enabling high-torque continuously variable speed ratios, electrically dominated launches, regenerative braking, engine off idling, and two-mode operation.

Driveability and durability factors suggest that frequent shift cycling between modes is generally undesirable and should be avoided. Shift busyness may not only be objectionable to the vehicle passengers but may also contribute significantly to premature clutch wear.

SUMMARY OF THE INVENTION

Therefore, it is generally desirable in an electrically variable transmission to avoid frequent shift cycling. This is accomplished in accordance with the present invention in which shifting is accomplished in accordance with a control based upon shift confidence factors determined in accordance with proportional and derivative input speed error quantities. Shift confidence factors may be determined in accordance with an accumulation of increments provided as a function of the proportional and derivative input speed error quantities. Additional authority limits may be placed upon the shift confidence factors in accordance with output speed derivative quantities. Finally, override of downshift control may be provided in accordance with additional input speed condition determinations.

DESCRIPTION OF THE PREFERRED EMBODIMENT

Figure 1:
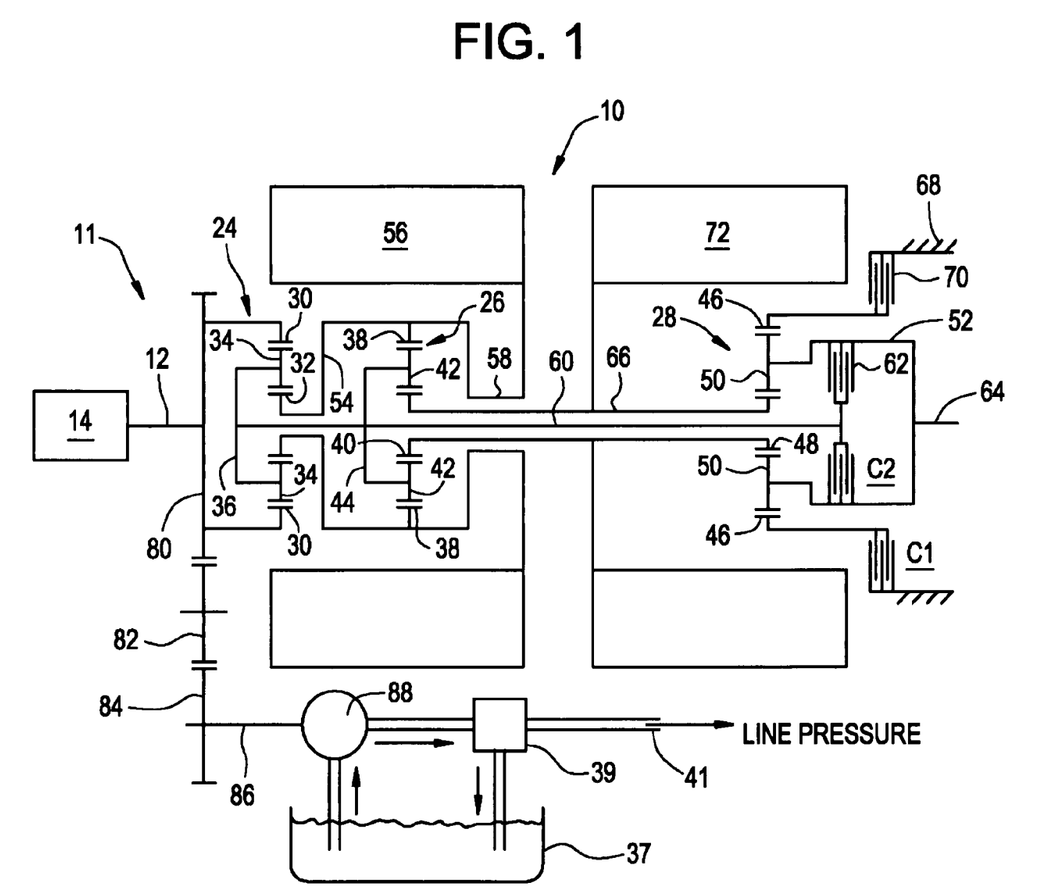
FIG. 1 is a mechanical hardware schematic representation of one preferred form of a two-mode, compound-split, electrically variable transmission particularly suited to the control of the present invention.
Figure 2:
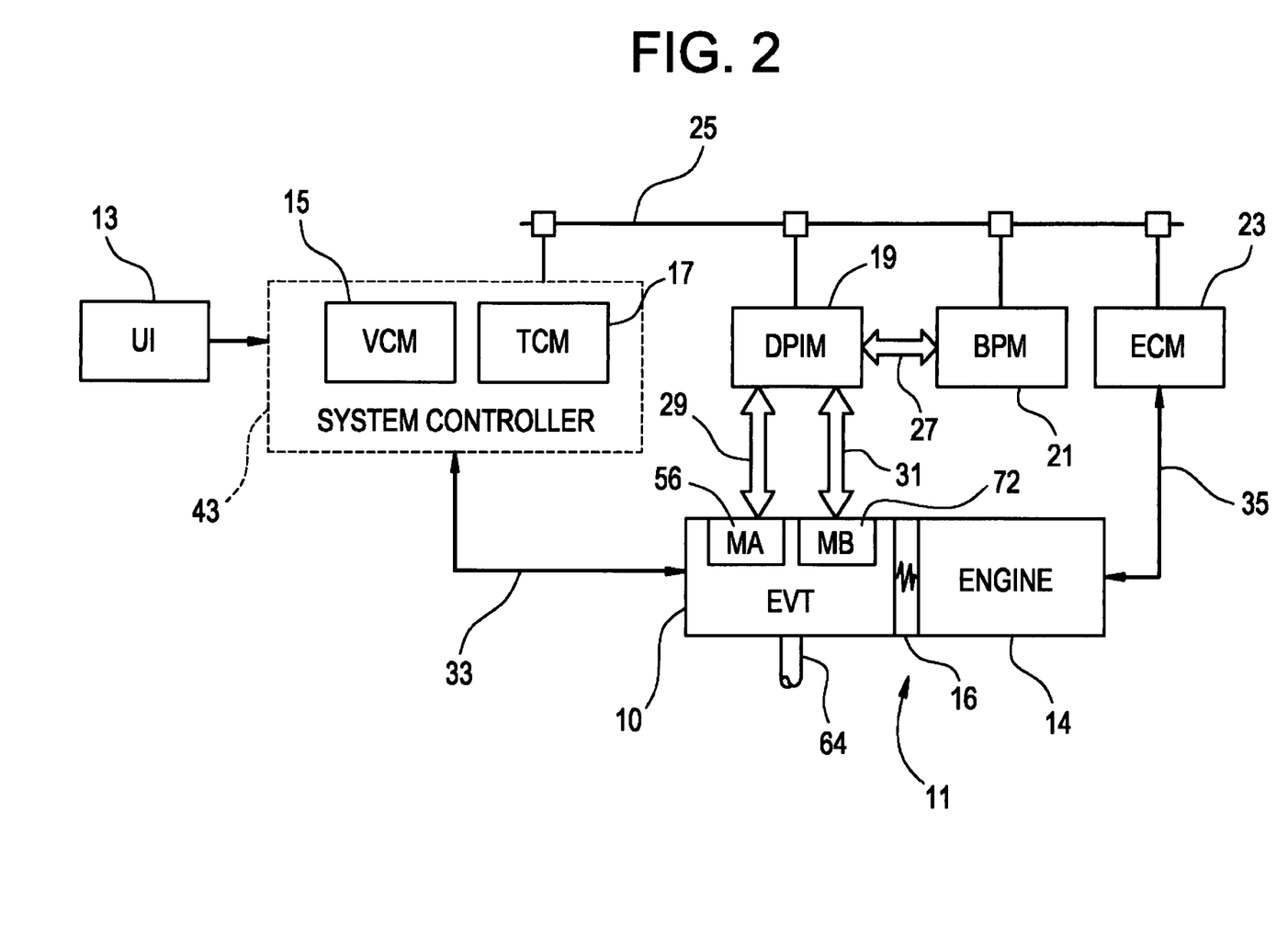
FIG. 2 is an electrical and mechanical schematic of a preferred system architecture for implementing the control of the present invention.

With reference first to FIGS. 1 and 2, a vehicular powertrain is generally designated 11. Included in the powertrain 11 is one representative form of a multi-mode, compound-split, electrically variable transmission (EVT) particularly suited for implementing the controls of the present invention and designated generally by the numeral 10 in FIGS. 1 and 2. With particular reference, then, to those figures, the EVT 10 has an input member 12 that may be in the nature of a shaft which may be directly driven by an engine 14 or, as shown in FIG. 2, a transient torque damper 16 may be incorporated between the output member of the engine 14 and the input member of the EVT 10. The transient torque damper 16 may incorporate, or be employed in conjunction with, a torque transfer device (not shown) to permit selective engagement of the engine 14 with the EVT 10, but it must be understood that such a torque transfer device is not utilized to change, or control, the mode in which the EVT 10 operates.

In the embodiment depicted the engine 14 may be a fossil fuel engine, such as a diesel engine which is readily adapted to provide its available power output delivered at a constant number of revolutions per minute (RPM). In the exemplary embodiment to which FIGS. 1 and 2 are directed, the engine 14 can—after start-up, and during the majority of its input—operate at a constant speed or at a variety of constant speeds in accordance with a desired operating point as may be determined from operator inputs and driving conditions.

The EVT 10 utilizes three planetary gear subsets 24, 26 and 28. The first planetary gear subset 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear subset 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear subset 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

While all three planetary gear subsets 24, 26 and 28 are "simple" planetary gear subsets in their own right, the first and second planetary gear subsets 24 and 26 are compounded in that the inner gear member 32 of the first planetary gear subset 24 is conjoined, as through a hub plate gear 54, to the outer gear member 38 of the second planetary gear subset 26. The conjoined inner gear member 32 of the first planetary gear subset 24 and the outer gear member 38 of the second planetary gear subset 26 are continuously connected to a first motor/generator 56, as by a sleeve shaft 58. First motor/generator 56 may also be referred to herein variously as motor A or MA.

The planetary gear subsets 24 and 26 are further compounded in that the carrier 36 of the first planetary gear subset 24 is conjoined, as through a shaft 60, to the carrier 44 of the second planetary gear subset 26. As such, carriers 36 and 44 of the first and second planetary gear subsets 24 and 26, respectively, are conjoined. The shaft 60 is also selectively connected to the carrier 52 of the third planetary gear subset 28, as through a torque transfer device 62 which, as will be hereinafter more fully explained, is employed to assist in the selection of the operational modes of the EVT 10. Torque transfer device 62 may also be referred to herein variously as second clutch, clutch two or C2.

The carrier 52 of the third planetary gear subset 28 is connected directly to the transmission output member 64. When the EVT 10 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear subset 26 is connected to the inner gear member 48 of the third planetary gear subset 28, as through a sleeve shaft 66 that circumscribes shaft 60. The outer gear member 46 of the third planetary gear subset 28 is selectively connected to ground, represented by the transmission housing 68, through a torque transfer device 70. Torque transfer device 70, as is also hereinafter explained, is also employed to assist in the selection of the operational modes of the EVT 10. Torque transfer device 70 may also be referred to herein variously as first clutch, clutch one or C1.

The sleeve shaft 66 is also continuously connected to a second motor/generator 72. Second motor/generator 72 may also be referred to herein variously as motor B or MB. All the planetary gear subsets 24, 26 and 28 as well as motor A and motor B (56, 72) are coaxially oriented, as about the axially disposed shaft 60. It should be noted that both motors A and B are of an annular configuration which permits them to circumscribe the three planetary gear subsets 24, 26 and 28 such that the planetary gear subsets 24, 26 and 28 are disposed radially inwardly of the motors A and B. This configuration assures that the overall envelope—i.e.: the circumferential dimension—of the EVT 10 is minimized.

A drive gear 80 may be presented from the input member 12. As depicted, the drive gear 80 fixedly connects the input member 12 to the outer gear member 30 of the first planetary gear subset 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and 88 which is supplied transmission fluid from sump 37, delivering high pressure fluid to regulator 39 which returns a portion of the fluid to sump 37 and provides regulated line pressure in line 41.

In the described exemplary mechanical arrangement, the output member 64 receives power through two distinct gear trains within the EVT 10. A first mode, or gear train, is selected when the first clutch C1 is actuated in order to "ground" the outer gear member 46 of the third planetary gear subset 28. A second mode, or gear train, is selected when the first clutch C1 is released and the second clutch C2 is simultaneously actuated to connect the shaft 60 to the carrier 52 of the third planetary gear subset 28.

Those skilled in the art will appreciate that the EVT 10 is capable of providing a range of output speeds from relatively slow to relatively fast within each mode of operation. This combination of two modes with a slow to fast output speed range in each mode allows the EVT 10 to propel a vehicle from a stationary condition to highway speeds. In addition, a fixed-ratio state wherein both clutches C1 and C2 are simultaneously applied is available for efficient mechanical coupling of the input member to the output member through a fixed gear ratio. Furthermore, a neutral state wherein both clutches C1 and C2 are simultaneously released is available for mechanically decoupling the output member from the transmission. Finally, the EVT 10 is capable to provide synchronized shifts between the modes wherein slip speed across both clutches C1 and C2 is substantially zero. Additional details regarding operation of the exemplary EVT can be found in commonly assigned U.S. Pat. No. 5,931,757, the contents of which are incorporated herein by reference.

Engine 14 is preferably a diesel engine and electronically controlled by engine control module (ECM) 23 as illustrated in FIG. 2. ECM 23 is a conventional microprocessor based diesel engine controller comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. ECM 23 functions to acquire data from a variety of sensors and control a variety of actuators, respectively, of the engine 14 over a plurality of discrete lines. For simplicity, ECM 23 is shown generally in bi-directional interface with engine 14 via aggregate line 35. Among the various parameters that may be sensed by ECM 23 are oil sump and engine coolant temperatures, engine speed (Ne), turbo pressure, and ambient air temperature and pressure. Various actuators that may be controlled by the ECM 23 include fuel injectors, fan controllers, engine preheaters including glow plugs and grid-type intake air heaters. ECM preferably provides for well known torque based controls for engine 14 in response to a torque command Te_cmd provided by the EVT control system. Such engines electronics, controls and quantities are generally well known to those skilled in the art and further detailed exposition thereof is not required herein.

As should be apparent from the foregoing description the EVT 10 selectively receives power from the engine 14. As will now be explained with continued reference to FIG. 2 the EVT also receives power from an electric storage device such as one or more batteries in battery pack module (BPM) 21. Other electric storage devices that have the ability to store electric power and dispense electric power may be used in place of the batteries without altering the concepts of the present invention. The BPM 21 is high voltage DC coupled to dual power inverter module (DPIM) 19 via DC lines 27. Current is transferable to or from the BPM 21 in accordance with whether the BPM 21 is being charged or discharged. DPIM 19 includes a pair of power inverters and respective motor controllers configured to receive motor control commands and control inverter states therefrom for providing motor drive or regeneration functionality. Motor controllers are microprocessor based controllers comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In motoring control, the respective inverter receives current from the DC lines and provides AC current to the respective motor over high voltage phase lines 29 and 31. In regeneration control, the respective inverter receives AC current from the motor over high voltage phase lines 29 and 3 land provides current to the DC lines 27. The net DC current provided to or from the inverters determines the charge or discharge operating mode of the BPM 21. Preferably, MA and MB are three-phase AC machines and the inverters comprise complementary three-phase power electronics. Individual motor speed signals Na and Nb for MA and MB, respectively, are also derived by the DPIM 19 from the motor phase information or conventional rotation sensors. Such motors, electronics, controls and quantities are generally well known to those skilled in the art and further detailed exposition thereof is not required herein.

System controller 43 is a microprocessor based controller comprising such common elements as microprocessor, read only memory ROM, random access memory RAM, electrically programmable read only memory EPROM, high speed clock, analog to digital (A/D) and digital to analog (D/A) circuitry, digital signal processor (DSP), and input/output circuitry and devices (I/O) and appropriate signal conditioning and buffer circuitry. In the exemplary embodiment, system controller 43 comprises a pair of microprocessor based controllers designated as vehicle control module (VCM) 15 and transmission control module (TCM) 17. VCM and TCM may provide, for example, a variety of control and diagnostic functions related to EVT and vehicle chassis including, for example, engine torque commands, input speed control, and output torque control in coordination with regenerative braking, anti-lock braking and traction control. Particularly with respect to EVT functionality, system controller 43 functions to directly acquire data from a variety of sensors and directly control a variety of actuators, respectively, of the EVT over a plurality of discrete lines. For simplicity, System controller 43 is shown generally in bi-directional interface with EVT via aggregate line 33. Of particular note, system controller 43 receives frequency signals from rotation sensors for processing into input member 12 speed Ni and output member 64 speed No for use in the control of EVT 10. System controller 43 may also receive and process pressure signals from pressure switches (not separately illustrated) for monitoring clutch C1 and C2 application chamber pressures. Alternatively, pressure transducers for wide range pressure monitoring may be employed. PWM and/or binary control signals are provided by system controller to EVT 10 for controlling fill and drain of clutches C1 and C2 for application and release thereof. Additionally, system controller 43 may receive transmission fluid sump 37 temperature data, such as from conventional thermocouple input (not separately illustrated) to derive sump temperature Ts and provide a PWM signal which may be derived from input speed Ni and sump temperature Ts for control of line pressure via regulator 39. Fill and drain of clutches C1 and C2 are effectuated by way of solenoid controlled spool valves responsive to PWM and binary control signals as alluded to above. Similarly, line pressure regulator 39 may be of a solenoid controlled variety for establishing regulated line pressure in accordance with the described PWM signal. Such line pressure controls are generally well known to those skilled in the art. Clutch slip speeds across clutches C1 and C2 are derived from output speed No, MA speed Na and MB speed Nb; specifically, C1 slip is a function of No and Nb, whereas C2 slip is a function of No, Na and Nb. Also illustrated is user interface (UI) block 13 which comprises such inputs to system controller 43 such as vehicle throttle position, push button shift selector (PBSS) for available drive range selection, brake effort and fast idle requests among others. System controller 43 determines a torque command Te_cmd and provides it to ECM 23. Torque command Te_cmd is representative of the EVT torque contribution desired from the engine as determined by the system controller.

The various modules described (i.e. system controller 43, DPIM 19, BPM 21, ECM 23) communicate via controller area network (CAN) bus 25. The CAN bus 25 allows for communication of control parameters and commands between the various modules. The specific communication protocol utilized will be application specific. For example the preferred protocol for heavy duty applications is the Society of Automotive Engineers standard J1939. The CAN bus and appropriate protocols provide for robust messaging and multi-controller interfacing between the system controller, ECM, DPIM, BPIM and other controllers such as antilock brake and traction controllers.

Figure 3:
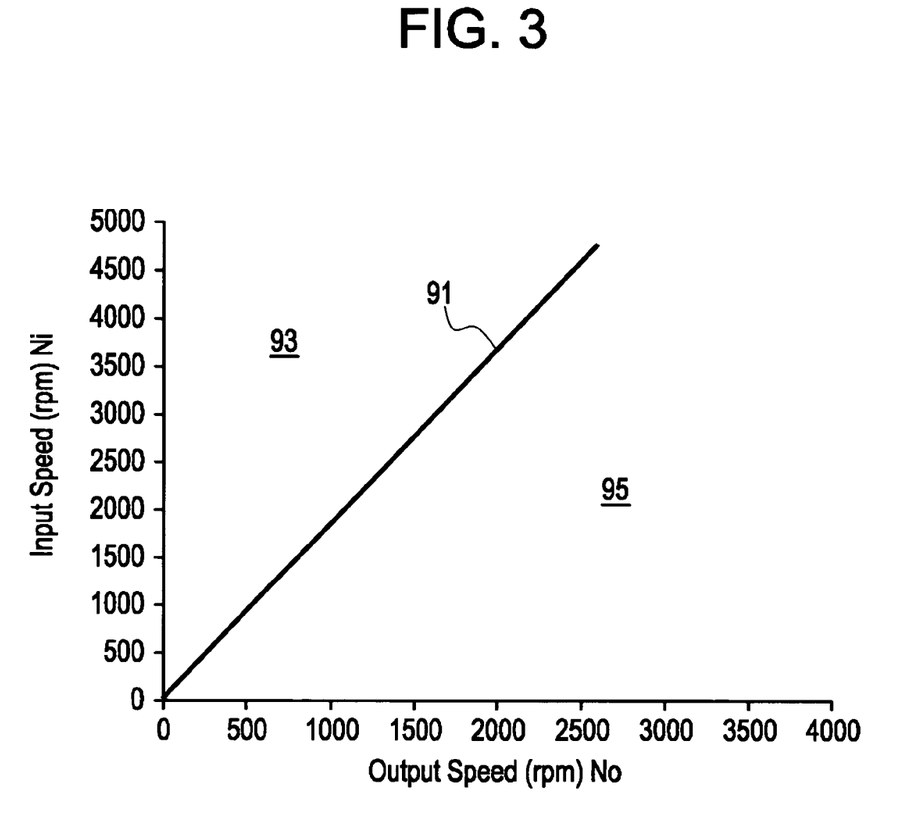
FIG. 3 is a graphical representation of various regions of operation with respect to input and output speeds of the exemplary EVT disclosed herein.

With reference to FIG. 3, a plot of output speed No along the horizontal axis versus input speed Ni across the vertical axis for the EVT 10 is illustrated. Synchronous operation, that is the input speed and output speed relationships whereat both clutch C1 and C2 are operating simultaneously with substantially zero slip speed thereacross is represented by line 91. As such, it represents the input and output speed relationships substantially whereat synchronous shifting from between modes can occur or whereat direct mechanical coupling from input to output can be effected by simultaneous application of both clutches C1 and C2, also known as fixed-ratio. One particular gearset relationship capable of producing the synchronous operation depicted by line 91 in FIG. 3 is as follows: outer gear member 30 having 91 teeth, inner gear member 32 having 49 teeth, planet gear members 34 having 21 teeth; outer gear member 38 having 91 teeth, inner gear member 40 having 49 teeth, planet gear members 42 having 21 teeth; outer gear member 46 having 89 teeth, inner gear member 48 having 31 teeth, planet gear members 50 having 29 teeth. Line 91 may be variously referred to herein as synchronous line, shift ratio line or fixed-ratio line.

To the left of the shift ratio line 91 is a preferred region of operation 93 for the first mode wherein C1 is applied and C2 is released. To the right of the shift ratio line 91 is a preferred region of operation 95 for the second mode wherein C1 is released and C2 is applied. When used herein with respect to clutches C1 and C2, the term applied indicates substantial torque transfer capacity across the respective clutch while the term released indicates insubstantial torque transfer capacity across the respective clutch. Since it is generally preferred to cause shifts from one mode to the other to occur synchronously, torque transfers from one mode into the other mode are caused to occur through a two clutch application fixed-ratio wherein, for a finite period prior to the release of the presently applied clutch, the presently released clutch is applied. And, the mode change is completed when fixed-ratio is exited by the continued application of the clutch associated with the mode being entered and the release of the clutch associated with the mode being exited. While region of operation 93 is generally preferred for the operation of the EVT in MODE 1, it is not meant to imply that MODE 2 operation of the EVT cannot or does not occur therein. Generally, however, it is preferred to operate in MODE 1 in region 93 because MODE 1 preferably employs gearsets and motor hardware particularly well suited in various aspects (e.g. mass, size, cost, inertial capabilities, etc.) to the high launch torques of region 93. Similarly, while region of operation 95 is generally preferred for the operation of the EVT in MODE 2, it is not meant to imply that MODE 1 operation of the EVT cannot or does not occur therein. Generally, however, it is preferred to operate in MODE 2 in region 95 because MODE 2 preferably employs gearsets and motor hardware particularly well suited in various aspects (e.g. mass, size, cost, inertial capabilities, etc.) to the high speeds of region 93. A shift into MODE 1 is considered a downshift and is associated with a higher gear ratio in accordance with the relationship of Ni/No. Likewise, a shift into MODE 2 is considered an upshift and is associated with a lower gear ratio in accordance with the relationship of Ni/No.

Figure 4:
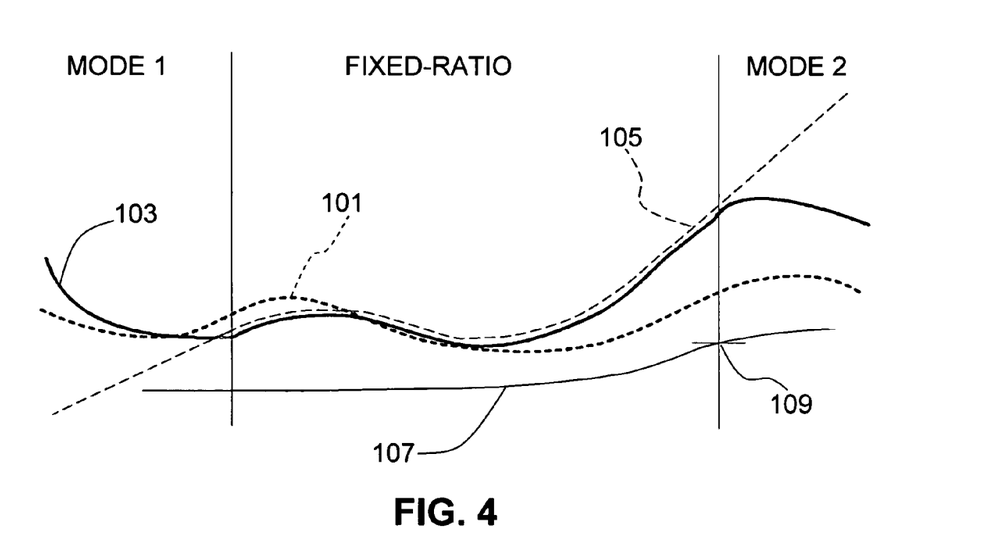
FIG. 4 is a graphical representation of various EVT and control quantities through an exemplary fixed-ratio to MODE 2 upshift carried out in accordance with the present invention.

With reference to FIG. 4, an exemplary illustration of an upshift accomplished in accordance with the present invention is shown. Three regions of EVT operation are delineated by the broken vertical lines in FIG. 4 and are separately labeled MODE 1, FIXED-RATIO and MODE 2. Trace 103 represents input member speed Ni which, in the case of a direct coupling of the engine 14 to the input member 12 of the EVT, is also the engine speed Ne. Trace 101 represents a desired input member speed Ni_des which, in the case of a direct coupling of the engine 14 to the input member 12 of the EVT, is also the desired engine speed Ne_des. Reference to desired input member speed therefore is interchangeable with desired engine speed and vice versa. Reference to one quantity herein shall be understood to be interchangeable with reference to the other. Desired input member speed is provided by the system controller, for example in accordance with a desired operating point of the engine to meet various efficiency and emission objectives. A preferred method of determining input speed is disclosed in commonly assigned and co-pending U.S. Ser. Nos. 10/686,508 and 10/686,034 which are incorporated herein by reference. Additionally, details on a preferred input speed controller can be found in commonly assigned and co-pending U.S. Ser. No. 10/686,511 which is incorporated herein by reference. Engine operating point may be set in accordance with various considerations, for example heavy torque demands and engine efficiency optimization. Trace 105 represents output member speed No multiplied by the effective gear ratio through the EVT 10. The gear ratio is variable in MODE 1 and MODE 2 in accordance with torque and speed control of MA and MB; however, the gear ratio is fixed in fixed-ratio and hence through fixed-ratio the output member speed multiplied by the gear ratio is substantially equivalent to the input member speed Ni as can be seen by the substantial equivalence between traces 103 and 105.

As previously described, fixed-ratio comprises operation of the EVT 10 wherein both clutched C1 and C2 are applied and carrying torque. Transition out of fixed-ratio into either MODE 1 or MODE 2 is accomplished in accordance with a shift confidence factor intended to reduce the incidence of shift cycling back into fixed-ratio. With reference to a preferred embodiment of the invention illustrated in part with respect to FIG. 5, the difference or proportional error between the desired input member speed Ni_des and actual input member speed Ni is labeled Ni_diff. The rate of change or derivative error of this difference is labeled Ni_diff dot. The proportional error quantity Ni_diff and derivative error quantity Ni_diff_dot are quantities calculated from actual input member speed and the desired input member speed. Actual input member speed may be directly measured as engine speed or input member speed or inferred from the fixed gear ratio and measured output member speed. Ni_diff and Ni_diff_dot are employed in look-up 111 to provide an increment 115 to the prior cycle's calculated shift confidence factor CF- to arrive at the present cycle's shift confidence factor CF. Increment as used herein is understood to include values which add or subtract value and as such may be either signed positive or negative. With reference to FIG. 6 the shift confidence factor CF is compared against a preset threshold CF_thresh which if exceeded will result in a shift being scheduled 117. In practice, it is generally more certain that a shift out of fixed-ratio is appropriate with a large, positive difference between the desired input speed and the actual input speed. Also, it is generally more certain that a shift out of fixed-ratio is appropriate when such difference is increasing.

A limit on the authority of the look-up 111 may additionally be employed. The rate of change of the output member speed is labeled No_dot in FIG. 5. No_dot is the quantity calculated from actual output member speed. Output member speed may be directly measured or inferred from the fixed gear ratio provided in fixed-ratio and input member speed or engine speed. No_dot is employed in look-up 113 to provide a limit upon the increment provided from table 111. The limit may be a hard limit upon the returned increment from look-up 111, a weight factor applied thereto or other attenuation thereof. In practice, a shift out of fixed-ratio into a higher gear ratio (MODE 1) may be less desirable when the vehicle is accelerating (i.e. output member accelerating) or a shift out of fixed-ratio into a lower gear ratio (MODE 2) may be less desirable when the vehicle is decelerating (i.e. output member decelerating).

Figure 5:
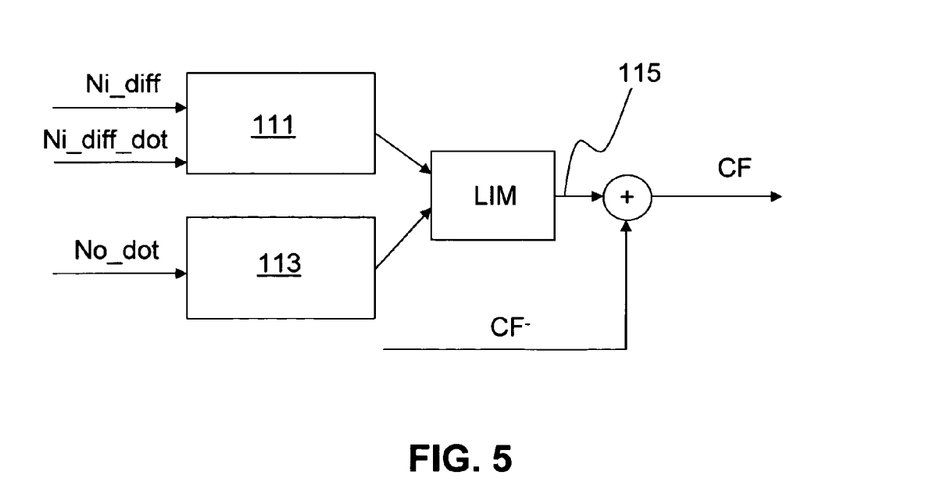
FIG. 5 is a control representation of the determination of a shift confidence factor in accordance with the present invention.
Figure 6:
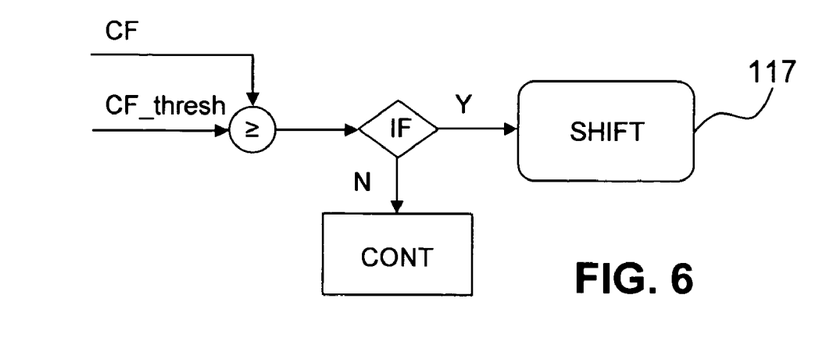
FIG. 6 is a control representation of shift scheduling in accordance with the shift confidence factor determined in accordance with the control of FIG. 5.
Figure 7A:
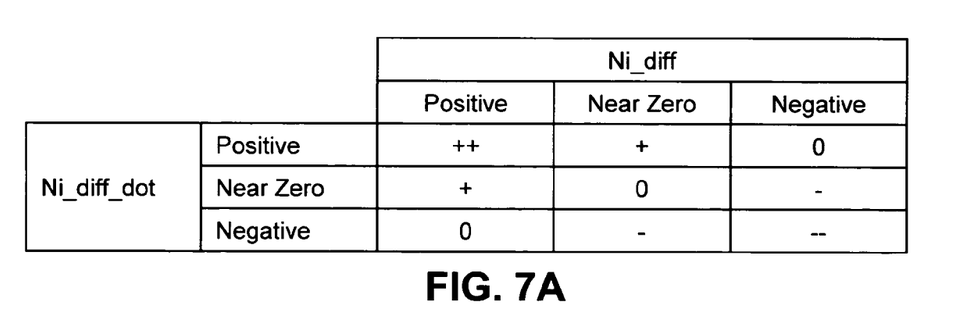
FIGS. 7A and 7B are representations of preferred look-ups for referencing increment values in determining shift confidence factors for downshifts and upshifts, respectively, in accordance with the control of FIG. 5.

Illustrated in FIG. 7A is a two-dimensional table structure particularly suited for implementation as look-up 111 as shown in FIG. 5 in arriving at a shift confidence factor for effectuating scheduling of a downshift from fixed-ratio to MODE 1. Ni_diff and Ni_diff dot are independent variables used to reference cells in the table containing increments for accumulation into the confidence factor CF as illustrated and described earlier with respect to FIG. 5.

As previously alluded to, where the speed differential Ni_diff is more positive (desired input speed>actual input speed) then generally the desirability of a downshift is more certain. Similarly, where the speed differential Ni_diff is more negative (desired input speed<actual input speed) then generally the desirability of a downshift is less certain. Hence, the table illustrates the general trend of increments from right to left (more negative to more positive Ni_diff) as increasing or more positive. Also, where Ni_diff dot is more positive, indicating a trend of larger positive Ni_diff or a trend of smaller negative Ni_diff, then generally the desirability of a downshift is more certain. And, where Ni_diff_dot is more negative, indicating a trend of larger negative Ni_diff or a trend of smaller positive Ni_diff, then generally the desirability of a downshift is less certain. Hence, the table illustrates the general trend of increments from bottom to top (more negative to more positive Ni_diff dot) as increasing, more positive or less negative. The CF increment trends in both dimensions of the table may be linear or non-linear with respect to the respective independent variable.

Figure 8A:
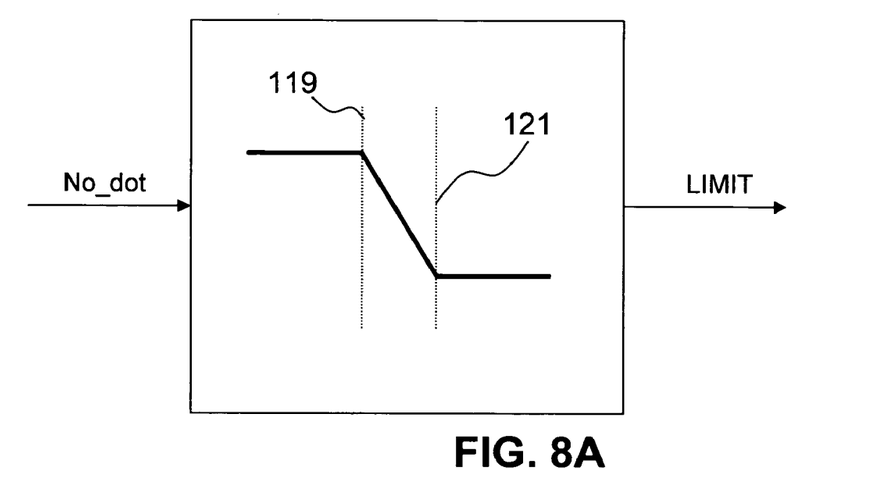
FIGS. 8A and 8B are representations of preferred look-ups for referencing limits to be applied to the shift confidence factors for downshifts and upshifts, respectively, in accordance with the control of FIG. 5; and, FIG. 9 is a control representation of an override of the normal shift confidence factor determination and shift scheduling to effectuate a forced downshift.

Illustrated in FIG. 8A is a graphical representation of a one-dimensional look-up table particularly suited for implementation as look-up 113 as shown in FIG. 5 in arriving at a limit on the shift confidence factor increment returned from table 111 for effectuating scheduling of a downshift from fixed-ratio to MODE 1. Output member acceleration No_dot is the independent variable used to reference cells in the table containing limits placed upon the increment of CF. Preferably, the limit is an absolute limit or value which will itself be come the increment value used in arriving at the present cycle's CF in the event that the increment returned from look-up 111 exceeds the limit value returned from look-up 113. As alluded to earlier, however, the limit may take the form of a weight applied to the increment returned from look-up 111 or other attenuation factor, filter or response modification or function as may be appropriate. For example, the linear function represented in FIG. 8A would return a relatively large absolute limit value, weight or minimal attenuation for a relatively small output member acceleration No_dot 119 and a relatively small limit value limit value, weight or maximum attenuation for a relatively large output member acceleration No_dot 121. Output member acceleration No_dot 119 may for example represent a substantially null acceleration whereas output member acceleration No_dot 121 may for example represent a maximum acceleration that the particular vehicle's output member is likely to experience with unbroken traction. An attenuation of the increment applied to the shift confidence factor for a downshift in accordance with the output member acceleration may prevent undesirable downshifts. For example when output speed goes from deceleration to acceleration due to an terrain change, the confidence factor, even though Ne_des is still high, will not increase due to the confidence factor increment limit.

Figure 7B:
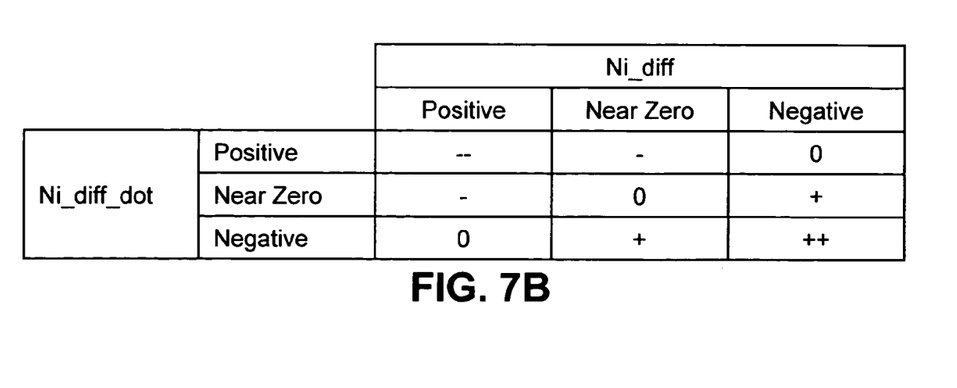

Upshift scheduling is handled by the present invention in a similar fashion. That is, the method represented in FIGS. 5 and 6 are adapted for use with different look-up 111 and 1113 for upshifts from fixed-ratio into MODE 2. In the case of upshifts, where the speed differential Ni_diff is more negative (desired input speed<actual input speed) then generally the desirability of an upshift is more certain. Similarly, where the speed differential Ni_diff is more positive (desired input speed>actual input speed) then generally the desirability of an upshift is less certain. Hence, the exemplary upshift table of FIG. 7B illustrates the general trend of increments from left to right (more positive to more negative Ni_diff) as increasing or more positive. Also, where Ni_diff_dot is more negative, indicating a trend of larger negative Ni_diff or a trend of smaller positive Ni_diff, then generally the desirability of an upshift is more certain. And, where Ni_diff dot is more positive, indicating a trend of smaller negative Ni_diff or a trend of larger positive Ni_diff, then generally the desirability of an upshift is less certain. Hence, the table illustrates the general trend of increments from bottom to top (more positive to more negative Ni_diff_dot) as decreasing, more negative or less positive. The CF increment trends in both dimensions of the upshift table 7B, like the downshift table of FIG. 7A, may be linear or non-linear with respect to the respective independent variable.

Figure 8B:
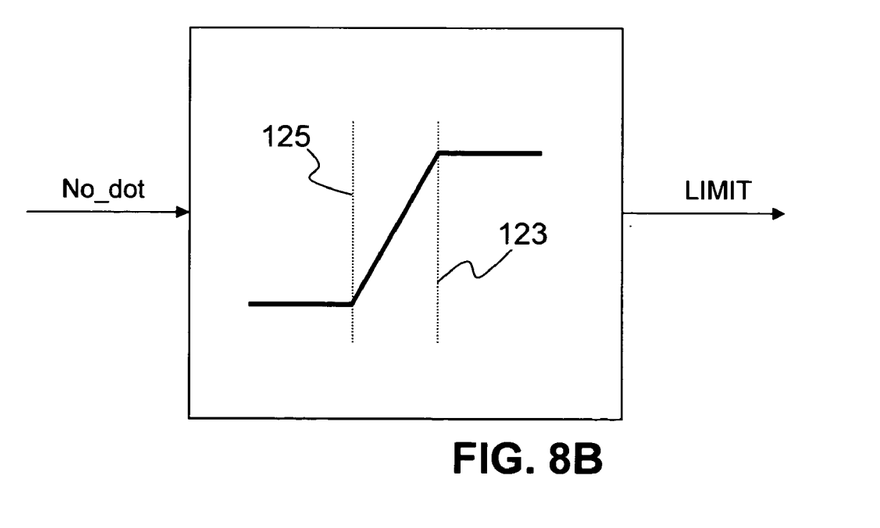

FIG. 8B is analogous to FIG. 8A but is suited for application to downshifts. FIG. 8B is a graphical representation of a one-dimensional look-up table particularly suited for implementation as look-up 113 as shown in FIG. 5 in arriving at a limit on the shift confidence factor increment returned from table 111 for effectuating scheduling of an upshift from fixed-ratio to MODE 2. Output member acceleration No_dot is the independent variable used to reference cells in the table containing limits placed upon the increment of CF. Preferably, the limit is an absolute limit or value which will itself be come the increment value used in arriving at the present cycle's CF in the event that the increment returned form look-up 111 exceeds the limit value returned from look-up 113. As alluded to earlier, however, the limit may take the form of a weight applied to the increment returned from look-up 111 or other attenuation factor, filter or response modification or function as may be appropriate. For example, the linear function represented in FIG. 8B would return a relatively large absolute limit value, weight or minimal attenuation for a relatively small output member deceleration No_dot 123 and a relatively small absolute limit value, weight or maximum attenuation for a relatively large output member deceleration No_dot 125. Output member deceleration No_dot 123 may for example represent a substantially null deceleration whereas output member deceleration No_dot 125 may for example represent a maximum deceleration that the particular vehicle's output member is likely to experience with unbroken traction. An attenuation of the increment applied to the shift confidence factor for an upshift in accordance with the output member deceleration may prevent undesirable upshifts. For example when output speed goes from acceleration to deceleration due to terrain change, the confidence factor, even though Ne_des is still low, will not increase due to the confidence factor increment limit.

Figure 9:
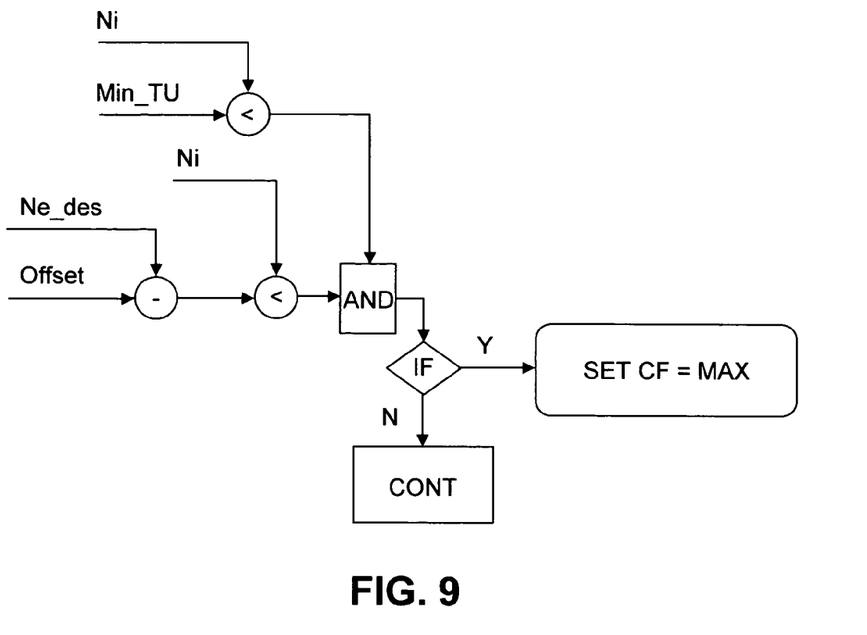

Finally, with respect to FIG. 9, an override of the normal confidence factor based shift decision process for downshifts is illustrated. Under certain operating conditions during which fixed-ratio is present it may be desirable to override the normal shift scheduling due to the effect that the direct mechanical coupling from input to output might have upon the engine. For example, it is possible that a vehicle coast or very light throttle application condition would result in a relatively low desired engine speed. However, a low enough vehicle speed might result in the engine being pulled down below not only the desired engine speed but also the engine low idle governor, for example 700 rpm. The shift confidence factor may not accumulate to a value to cause a down shift quickly enough to avoid engine lugging particularly where the desired engine speed (desired Ni) follows a profile which remains below the actual input speed at least until a point whereat the continued trending of the input member speed will cause engine lugging before the shift confidence factor accumulates to the point of a downshift. If the engine encounters a lugging condition, the engine control would attempt to compensate by increasing engine output torque to bring the engine speed up to the low idle speed which would undesirably result in loss of input speed/torque control, output torque disturbances and uncontrolled battery charging due to higher actual input power than commanded. The present invention provides an override to the norm shift confidence factor when the conditions are such that an engine lugging situation is likely to occur. In this regard, a downshift is forced in order that the input member speed—also the engine speed—is allowed to increase an remain above the engine low idle governor speed. This is accomplished in on respect by the logic shown in FIG. 9 wherein the input member speed is compared to two independent thresholds. First, Ni is compared to a minimum calibrated fixed-ratio speed, Min_TU, for example 750 rpm. Additionally, the input member speed Ni is compared to the desired engine speed, Ne_des, less a calibration offset, for example 50 rpm. When the input member speed is below both comparisons then the downshift confidence factor is set to a large value, such as a maximum value, sufficient to immediately schedule a downshift regardless of what the normal accumulator control would have provided.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. Method for scheduling shifts from a fixed-ratio mode to first and second modes in an electrically variable transmission including an input member and an output member, first and second clutches, said first mode characterized by simultaneous first clutch application and second clutch release, said second mode characterized by simultaneous first clutch release and second clutch application, said fixed-ratio mode characterized by simultaneous first and second clutch applications wherein the transmission input member is mechanically coupled to the transmission output member through a predetermined fixed ratio, comprising:
  calculating a first signal as the difference between a desired input member speed and an actual input member speed;
  calculating a second signal as the time rate of change of the first signal; and
  calculating a third signal as the time rate of change of an output member speed;
  scheduling shifts in accordance with shift confidence factors determined as functions of the first, second and third signals wherein shifts into the first mode are scheduled in accordance with a first shift confidence factor and shifts into the second mode are scheduled in accordance with a second shift confidence factor; and,
  wherein the first shift confidence factor generally trends larger when the first and second signals are positive and generally trends smaller when the first and second signals are negative, and the second shift confidence factor generally trends smaller when the first and second signals are positive and generally trends larger when the first and second signals are negative.

2. Method for scheduling shifts as claimed in claim 1 wherein the trending of the first and second shift confidence factors is attenuated as a function of the third signal.

3. Method for scheduling shifts as claimed in claim 1 wherein the trending of the first shift confidence factor only is attenuated when the third signal is positive and the second shift confidence factor only is attenuated when the third signal is negative.

4. Method for scheduling shifts from a fixed-ratio mode to first and second modes in an electrically variable transmission including an input member and an output member, first and second clutches, said first mode characterized by simultaneous first clutch application and second clutch release, said second mode characterized by simultaneous first clutch release and second clutch application, said fixed-ratio mode characterized by simultaneous first and second clutch applications wherein the transmission input member is mechanically coupled to the transmission output member through a predetermined fixed ratio, comprising:
  calculating a first signal as the difference between a desired input member speed and an actual input member speed;
  calculating a second signal as the time rate of change of the first signal;
  calculating a third signal as the time rate of change of an output member speed; and,
  scheduling shifts in accordance with shift confidence factors determined as functions of the first, second and third signals;
  wherein shifts to the first mode are scheduled when the actual input member speed falls below a predetermined minimum threshold speed and falls below the desired input speed by a predetermined amount.

5. Method for scheduling shifts from a fixed-ratio mode to first and second modes in an electrically variable transmission including an input member and an output member, first and second clutches, said first mode characterized by simultaneous first clutch application and second clutch release, said second mode characterized by simultaneous first clutch release and second clutch application, said fixed-ratio mode characterized by simultaneous first and second clutch applications wherein the transmission input member is mechanically coupled to the transmission output member through a predetermined fixed ratio, comprising:
  calculating a first signal as the difference between a desired input member speed and an actual input member speed;
  calculating a second signal as the time rate of change of the first signal; and
  scheduling shifts in accordance with shift confidence factors determined as functions of the first and second signals.

6. Method for scheduling shifts as claimed in claim 5 further comprising:
  calculating a third signal as the time rate of change of an output member speed; and,
  scheduling shifts in accordance with shift confidence factors determined as functions of the first, second and third signals.

7. Method for scheduling shifts as claimed in claim 6 wherein scheduling shifts into the first mode is in accordance with a first shift confidence factor and scheduling shifts into the second mode is in accordance with a second shift confidence factor.

8. Method for scheduling shifts as claimed in claim 5 wherein:
  the shift confidence factors are incremented as a function of a) the first signal and b) the second signal; and,
  shifts are scheduled when the shift confidence factors attain predetermined thresholds.

* * * * *